United States Patent [19]

Fox

[11] 3,879,670

[45] Apr. 22, 1975

[54] SYNCHRONOUS DEMODULATOR CIRCUIT

[75] Inventor: David A. Fox, Lima, Ohio

[73] Assignee: Westinghouse Electric Corporation, Pittsburgh, Pa.

[22] Filed: Apr. 11, 1974

[21] Appl. No.: 460,252

[52] U.S. Cl. .................................. 329/50; 328/134
[51] Int. Cl. ............................................ H03d 3/18
[58] Field of Search ....... 329/50; 325/346; 328/134; 358/25

[56] References Cited

UNITED STATES PATENTS

| | | | |
|---|---|---|---|
| 3,659,210 | 4/1972 | Nilsson | 328/13 X |
| 3,699,461 | 10/1972 | Huntsinger | 329/50 |
| R26,210 | 5/1967 | Russell | 329/50 X |

*Primary Examiner*—Alfred L. Brody
*Attorney, Agent, or Firm*—G. H. Telfer

[57] ABSTRACT

A synchronous demodulator is provided for receiving signals including one that is subject to variation in waveform and a predetermined reference signal having a known waveform from which signals is produced a demodulated output representing the relationship between the first and second signals with respect to their phase and amplitude. The apparatus includes means such as a signal transformer with a center-tapped secondary to produce two phase displaced signals from the first signal which are then applied by means such as a gate controlled two-channel input amplifier to the input of an amplifier such as an operational amplifier from which the demodulated output is obtained. Application to reactive load division between parallel AC generators is advantageous.

6 Claims, 7 Drawing Figures

SYNCHRONOUS DEMODULATOR CIRCUIT

BACKGROUND OF THE INVENTION

This invention relates generally to electronic apparatus for demodulating a variable electrical signal in accordance with a reference waveform.

Demodulators are known types of electronic apparatus among which are included synchronous demodulators whose output takes into account the phase difference as well as the amplitude difference between two input signals. Certain applications require certain performance characteristics and objectives of minimized cost and size making improvement over the state of the art desirable.

While the present invention has more general application it will be primarily discussed in the context of the application whose requirements gave rise to it, namely for use in a reactive load division (RLD) circuit to help equalize loading of parallel AC generators.

Power sources are often operated in parallel to obtain power producing capability that is more reliable and offers more flexibility in use and increased capacity than an individual power source. It is usually desirable to equalize loading of the power sources so that none of the individual sources is overloaded subjecting it to damage. In AC systems, to which the invention pertains, there are two quantities that can be adjusted to maintain satisfactory load division. They are the respective voltage levels of the sources and also the phase angle or phase difference between the outputs of the sources.

With a voltage unbalance between the sources, an unbalanced current occurs that is essentially reactive. If there is a mismatch in the phase angle of the power from the two sources there is a real current unbalance on the common bus. AC generators are usually equipped with a regulator to control the voltage and a governor or constant speed drive to control the speed of the prime mover. For effective paralleling of AC generators it is necessary to sense the reactive and real current unbalances separately and adjust the frequency and voltage controls accordingly. The sensing circuit in the voltage regulator for sensing the reactive current unbalance is called the reactive load division or RLD circuit.

It is also known to use a bridge-type demodulator circuit where a difference current signal from a current transformer on one phase conductor is used to unbalance a bridge driven from that phase and another phase, where contemplating a three-phase system. The output of the circuit is connected to the sensing voltage divider of the regulator and biases the sensing voltage divider of the regulator and biases the sensing voltage up or down. The regulator then adjusts the generator voltage to minimize the unbalanced current. Such a demodulator RLD circuit has an advantage in that the phase angle of the reference voltage derived from the power of phases A and B may be easily shifted by adjusting the value of one resistor. The disadvantage of the circuit is that the output consists of large amplitude square waves which must be filtered by an L-C filter. The L-C filter introduces a long time constant which makes the system too slow for newer, faster generators requiring faster adjustment of an imbalance. Such demodulators as just described have been made in which the cross link of the bridge referred to is a Zener diode and such circuits are characterized as Zener demodulators.

Another type of demodulator used in known RLD circuits is a ring demodulator in which a demodulator signal is applied between a reference and comparator in the regulator. Because this type of demodulator is balanced, there is no large AC signal in the output, thus it may be filtered with only a single R-C network with a reasonably fast time constant. The disadvantage of this circuit is that it requires two transformers and the phase reference derived is adjustable only by adding a capacitor of chosen value across the burden resistor of a current transformer on one of the phases.

Because of the drawbacks of the known prior art as above described, a new form of demodulator circuit was sought, leading to the present invention.

SUMMARY OF THE INVENTION

In accordance with this invention, a synchronous demodulator is provided for receiving signals including one that is subject to variation, such as on one phase conductor, and a predetermined reference signal having a known waveform from which signals is produced a demodulated output representing the relationship between the first and second signals with respect to their phase and amplitude. The apparatus includes means such as a signal transformer with a center-tapped secondary to produce two phase displaced signals from the first signal which are then applied by means such as a multiplier or a gate controlled two-channel input amplifier to the input of an amplifier such as an operational amplifier from which the demodulated output is obtained.

The referred-to gate controlled two input channel amplifier is a commercially available device having moderate gain but whose main distinctive characteristic is its ability to have applied to its input terminals different signals with alternate switching between the respective inputs occurring therein. In certain applications, and particularly in those of interest for RLD circuits, the output of the gate controlled amplifier is applied to a high quality operational amplifier for increased gain. It will be understood, however, that the alternate switching amplifier and its further amplification may be included in one device or integrated circuit.

In the following description three different arrangements of the basic elements will be described which may be referred to as a feedback type, an inverting type and a non-inverting type. The feedback type is characterized by connection of the amplifier output to the center tap of the signal transformer secondary and is most preferred because, as will be shown by the further description, the inverting type requires an excessive number of resistors and lacks economy and low power dissipation and the non-inverting type provides only a limited input range of operational voltage levels.

DESCRIPTION OF THE PREFERRED EMBODIMENTS

Figure 1:
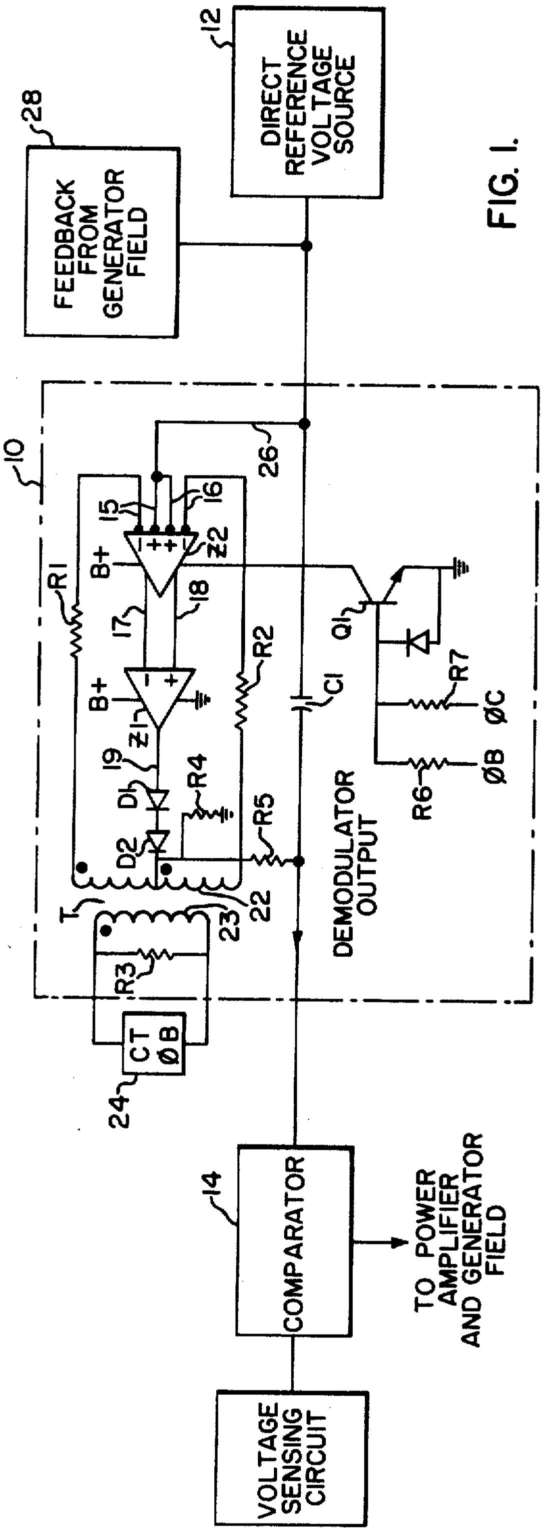
FIG. 1 is a circuit schematic of one embodiment of the demodulator circuit of the present invention in the context of an RLD circuit for AC generator load balancing.

Referring to FIG. 1, a demodulator circuit 10 in accordance with this invention is shown within the dot-dash line and is in the context of a conventional type of AC, three-phase, generator system and is connected between a source of reference potential 12 and a comparator 14 which may each be formed in accordance with known practice.

The demodulator circuit includes a gated operational amplifier Z2. Amplifier Z2 has two sets of inputs 15 and 16 which are selected by the channel select input means within the device. The device Z2 is preferably a commercially available device supplied by manufacturers such as Motorola as an integrated circuit and identified as a "gate controlled two-channel input wide-band amplifier" such as that designated as type MC1545 and also described in Motorola publication "Linear Integrated Circuits Data Book", dated December, 1972, at pages 7-213 to 7-218. While this integrated circuit is the preferable form, it will be recognized that a known type of circuit portion known as a multiplier circuit may be employed for the qualities desired of the gate-controlled amplifier Z2.

Because Z2 in this embodiment is a rather low performance amplifier with differential output and low gain, amplifier Z1 is connected to the outputs 17 and 18 of Z2 to increase the gain and provide a single ended output 19. For some purposes the elements Z1 and Z2 will be considered together as an operational amplifier.

Figures 2, 6:
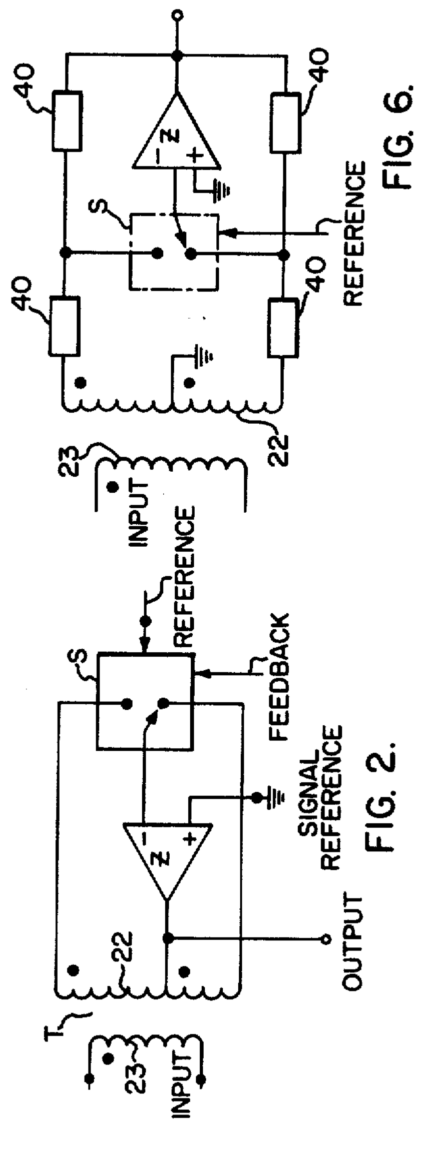
FIG. 2 is a simplified circuit schematic of the demodulator circuit portion of the system of FIG. 1.

Referring briefly to FIG. 2 where a simplified circuit schematic is shown the amplifier portion Z includes the amplifier elements of both Z1 and Z2 of FIG. 1 while the switch portion S is equivalent to the channel select control of Z2.

The apparatus of FIG. 1 includes also a signal transformer T having a center-tapped secondary 22. The primary 23 of signal transformer T is supplied a first variable input signal such as from a current transformer 24 on one phase (e.g. phase B) of the system which provides a time varying electrical signal having a waveform subject to variation. The ends of the transformer secondary 22 are connected through resistors R1 and R2 respectively to inverting inputs of the gate-controlled amplifier Z2. The center tap of the signal transformer secondary is connected to the output of operational amplifier Z1. In this embodiment this connection includes a pair of serially connected diode rectifiers D1 and D2. It is from this center tap that the output of the demodulator is located.

The signal transformer T constitutes a means for developing two phase displaced signals having zero degrees and 180° phase displacement respectively from the signal on the current transformer 24 with equal peak magnitude with respect to a common point which occurs at the center tap of the secondary winding 22. These two phase displaced signals are applied to Z2 through R1 and R2. There is also applied to Z2 a reference waveform to the non-inverting inputs on line 26 that is developed from the generator field 28 and from a regulated source of direct voltage 12.

The signal transformer T may have a one-to-one turns ratio. Referring to FIG. 2 again, when switch S is in the position shown the lower end of the secondary winding 22 is virtually shorted to the reference terminal by the closed loop action of the amplifier. This means that the voltage at the center tap of winding 22 will be equal to the input voltage at the primary. When switch S is moved to the other position, the upper end of the winding is shorted to the reference and the output is of the opposite polarity.

Resistors R6 and R7 add currents derived respectively from phase B and phase C to drive transistor Q1 90° lagging phase B. The collector of Q1 drives the channel select input of Z2 in phase with reactive current of phase B causing the circuit to demodulate the reactive component of the load current.

Figure 3:
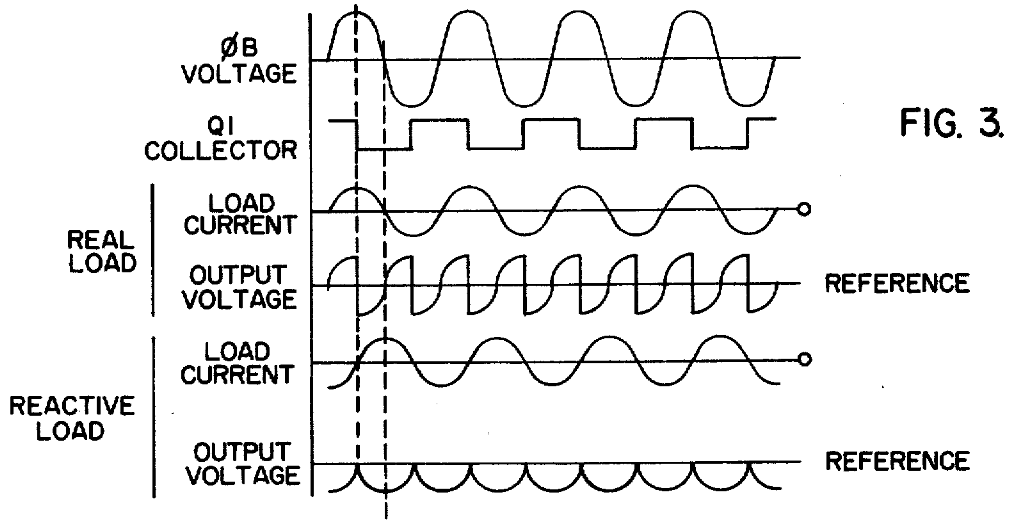
FIG. 3 is a set of waveforms illustrative of the operation of the circuit of FIG. 1.

FIG. 3 illustrates representative waveforms as they occur in the circuit. The voltage of $\theta B$ is shown as a sinusoidally varying waveform, although the circuit will work satisfactorily with any periodic waveform. The voltage at the Q1 collector is seen to be phase shifted 90° lagging the $\theta B$ voltage signal.

A load current signal containing only a real component of load would appear in phase with the voltage as shown. The demodulator inverts half cycle portions of the signal (when Q1 collector is low) to produce the demodulated signal as shown. Note that the average value of the demodulated signal is zero and thus would have no biasing effect on the operation of the voltage regulator.

A reactive load signal would appear as shown lagging the voltage signal by 90° (and thus in phase with Q1 collector voltage). Inverting the reactive load signal on alternate half cycles produces the waveform which appears to be a full-wave rectified signal. This signal has a net DC effect and will bias the regulator reference to reduce excitation to the generator.

The following suitable values and other identifications are supplied by way of further example for implementation of the demodulation circuit 10 of FIG. 1 in a particular generator system:

| | |
|---|---|
| Operational Amplifier Z1 | Type 741 |
| Gated Amplifier Z2 | Type MC1545 |
| Resistors R1 and R2 | 4700 ohms |
| Resistor R3 (across winding 23) | 8.9 ohms |
| Resistor R4 | 5,600 ohms |
| Resistor R5 | 12,000 ohms |
| Resistor R6 | 36,000 ohms |
| Resistor R7 | 18,000 ohms |
| Transistor Q1 | Type 2N2219A |
| Capacitor C1 | 0.1 microf. |
| CT 24 | 2375:1 turns ratio |

The generator was 75 KVA, 115 v., 3 phase, 400 Hz for aircraft applications.

Figure 4:
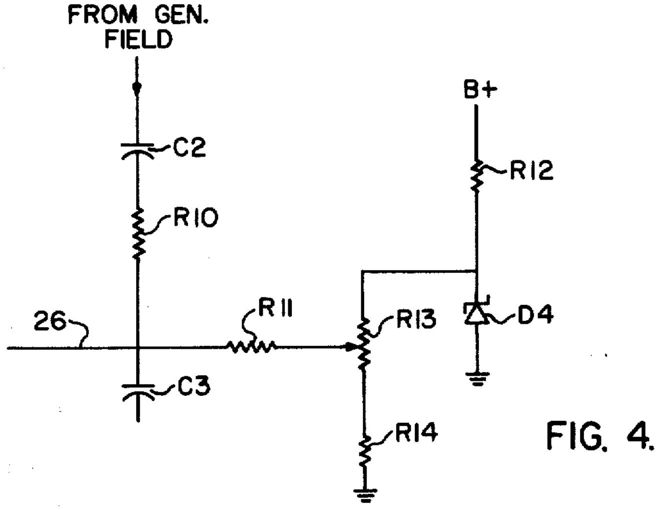
FIG. 4 is a more detailed circuit schematic of a portion of the circuit of FIG. 1.

An example of the configuration of the direct reference voltage source 12 and the feedback circuit 28 is shown in FIG. 4. While not necessary to detail the operation of the circuit portion of FIG. 4, suitable values of components for use in conjunction with those just given for the demodulator 10 are:

| | |
|---|---|
| Capacitor C2 | 0.1 microf. |
| Resistor R10 | 100 K ohms |
| Capacitor C3 | 1.8 microf. |
| Resistor R11 | 3,000 ohms |
| Zener Diode D4 | 6.4 V. breakdown |

-Continued

| | |
|---|---|
| Resistor R12 | 1,210 ohms |
| Variable Resistor R13 | 5,000 ohms |
| Resistor R14 | 12,100 ohms |

The new circuit offers the advantage of easy adjustment of the reference phase angle between phases B and C by changing resistors R6 and R7. Also only one magnetic component, the signal transformer I is required. The ease of adjustment and elimination of one magnetic component means that the new circuit offers cost advantages where labor rates are constantly increasing and IC costs are decreasing.

Figure 5:
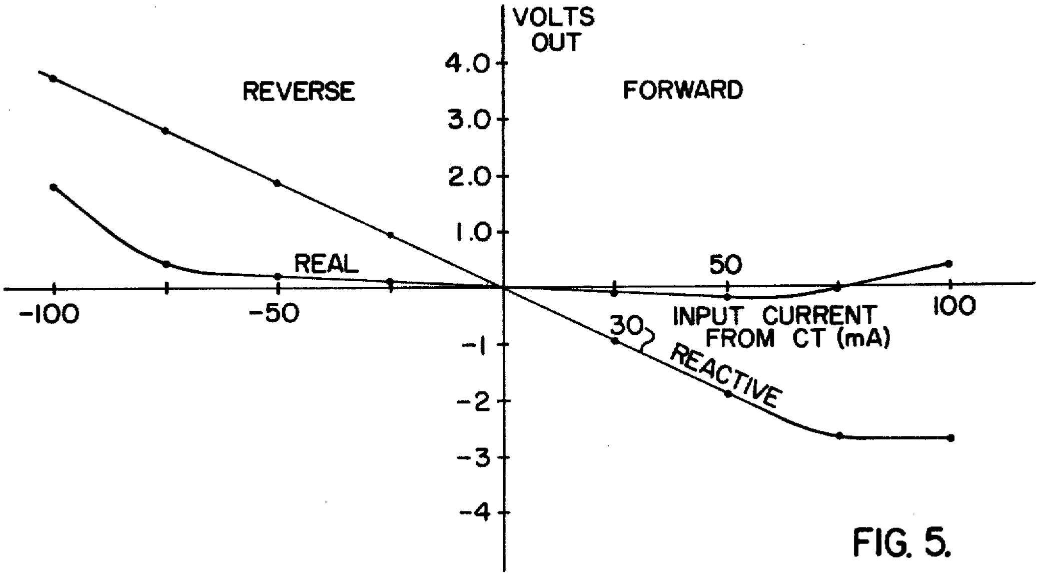
FIG. 5 is a graph illustrating the performance of the circuit of FIG. 1.

Referring to FIG. 5, there is shown a typical performance curve for the circuit of FIG. 1 illustrating the good linearity of the reactive load line 30 over a wide range of load currents.

Figure 7:
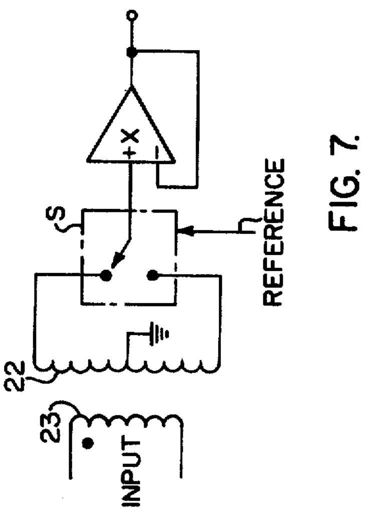
FIGS. 6 and 7 are simplified circuit schematic diagrams of alternative embodiments of the demodulator circuit of the present invention.

FIGS. 6 and 7 illustrate additional alternative embodiments of the present invention in simplified form. In FIG. 6 there is shown an inverting type of demodulator wherein the output of the amplifier Z (comprising Z1 and Z2) is coupled to the ends of the signal transformer secondary winding 22 through the resistors 40, which resistors are the principal disadvantage of this embodiment. In FIG. 7 is shown an embodiment of a non-inverting type having a limited input range. Other variations and specific implementations will be apparent to those skilled in the art.

I claim:

1. A synchronous demodulator comprising: a first terminal for receiving a first time varying electrical signal whose waveform is subject to variation, a second terminal for receiving a second, reference, time varying electrical signal having a predetermined waveform not subject to variation; means for developing two phase displaced signals having 0° and 180° phase displacement respectively from said first signal and equal peak magnitude with respect to a common point; means for amplifying; and means for applying switched signals comprising said phase displaced signals in synchronism with said reference signal to an input terminal of said means for amplifying; said means for amplifying having an output terminal at which appears a demodulated output representing the relationship between said phase displaced signals and said reference signal.

2. The subject matter of claim 1 wherein: said means for developing two phase displaced signals comprises a signal transformer with a center-tapped secondary.

3. The subject matter of claim 1 wherein: said means for amplifying comprises an inverting input terminal and a non-inverting input terminal; said means for applying switched signals is connected to said inverting input terminal and said non-inverting input terminal is maintained at a reference level; and said output terminal is at said common point.

4. The subject matter of claim 1 wherein: said means for amplifying comprises an inverting input terminal and a non-inverting input terminal; said means for applying switched signals is connected to said inverting input terminal and said non-inverting input terminal is maintained at a reference level; and said output terminal is resistively coupled to said means for developing phase displaced signals.

5. The subject matter of claim 1 wherein: said means for amplifying comprises an inverting input terminal and a non-inverting input terminal; said means for applying switched signals is connected to said non-inverting input terminal and said inverting input terminal is connected to said output terminal.

6. The subject matter of claim 1 wherein: said means for applying switched signals comprises a gate controlled two channel input amplifier.

* * * * *